(12) United States Patent
Carter (10) Patent No.: US 10,151,368 B2
(45) Date of Patent: Dec. 11, 2018

(54) NESTED CANTED COIL SPRINGS, APPLICATIONS THEREOF, AND RELATED METHODS

(71) Applicant: Bal Seal Engineering, Inc., Foothill Ranch, CA (US)

(72) Inventor: Brian Carter, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 103 days.

(21) Appl. No.: 14/701,431

(22) Filed: Apr. 30, 2015

(65) Prior Publication Data

US 2015/0316115 A1 Nov. 5, 2015

Related U.S. Application Data

(60) Provisional application No. 61/988,096, filed on May 2, 2014.

(51) Int. Cl.
*F16F 1/04* (2006.01)
*H01R 4/48* (2006.01)
(Continued)

(52) U.S. Cl.
CPC .............. *F16F 3/06* (2013.01); *F16F 1/045* (2013.01); *F16F 1/12* (2013.01); *H01R 13/2421* (2013.01);
(Continued)

(58) Field of Classification Search
USPC ........................................................ 267/167
See application file for complete search history.

(56) References Cited

U.S. PATENT DOCUMENTS

| 3,174,500 | A | | 3/1965 | Johnson et al. | |
|---|---|---|---|---|---|
| 3,880,414 | A | * | 4/1975 | Smith | F16F 3/04 267/168 |

(Continued)

FOREIGN PATENT DOCUMENTS

| CH | 254036 A | 4/1948 |
|---|---|---|
| DE | 19807663 | 9/1999 |

(Continued)

OTHER PUBLICATIONS

Extended European Search Report from the European Patent Office on corresponding EP application (EP15166168.3) dated Mar. 31, 2016.

(Continued)

*Primary Examiner* — Joshua J Michener
*Assistant Examiner* — Kyle J. Walraed-Sullivan
(74) *Attorney, Agent, or Firm* — Klein, O'Neill & Singh, LLP (57) ABSTRACT

A spring assembly having at least two canted coil spring lengths nested together are disclosed. Two sections of coils of a canted coil spring length can each be positioned between two adjacent coils of another canted coil spring. Each section of the coils of the canted coil spring length includes at least one coil and up to several coils or a plurality of coils. The canted coil spring lengths are nested together to increase the deflection force of the overall spring assembly. The spring assembly having two or more nested spring lengths can be used in connector applications.

22 Claims, 8 Drawing Sheets

(51) Int. Cl.
*F16F 3/06* (2006.01)
*F16F 1/12* (2006.01)
*H01R 13/24* (2006.01)
*H01R 13/17* (2006.01)
*H01R 13/187* (2006.01)

(52) U.S. Cl.
CPC ............ *H01R 13/17* (2013.01); *H01R 13/187* (2013.01); *Y10T 403/70* (2015.01)

(56) References Cited

U.S. PATENT DOCUMENTS

| | | | |
|---|---|---|---|
| 4,148,469 A * | 4/1979 | Geyer | F16F 3/04 267/168 |
| 4,441,780 A | 4/1984 | Walters | |
| 4,655,462 A * | 4/1987 | Balsells | F16J 15/3212 267/1.5 |
| 4,678,210 A | 7/1987 | Balsells | |
| 4,826,144 A | 5/1989 | Balsells | |
| 4,830,344 A | 5/1989 | Balsells | |
| 4,872,710 A | 10/1989 | Konecny et al. | |
| 4,876,781 A | 10/1989 | Balsells | |
| 4,893,795 A | 1/1990 | Balsells | |
| 4,907,788 A * | 3/1990 | Balsells | F16F 1/04 267/1.5 |
| 4,915,366 A | 4/1990 | Balsells | |
| 4,934,666 A | 6/1990 | Balsells | |
| 4,961,253 A | 10/1990 | Balsells | |
| 4,964,204 A | 10/1990 | Balsells | |
| 4,974,821 A | 12/1990 | Balsells | |
| 5,108,078 A | 4/1992 | Balsells | |
| 5,117,066 A * | 5/1992 | Balsells | F16F 1/04 174/370 |
| 5,139,243 A | 8/1992 | Balsells | |
| 5,139,276 A | 8/1992 | Balsells | |
| 5,149,642 A | 9/1992 | Mazur et al. | |
| 5,160,122 A | 11/1992 | Balsells | |
| 5,203,849 A | 4/1993 | Balsells | |
| 5,239,737 A | 8/1993 | Balsells | |
| 5,411,348 A | 5/1995 | Balsells | |
| 5,482,261 A * | 1/1996 | Ortega | F16F 3/06 267/166 |
| 5,503,375 A | 4/1996 | Balsells | |
| 5,545,842 A | 8/1996 | Balsells | |
| 5,570,719 A | 11/1996 | Richards et al. | |
| 5,709,371 A * | 1/1998 | Balsells | F16F 3/04 267/167 |
| 5,791,638 A * | 8/1998 | Balsells | F16F 3/04 267/167 |
| 6,217,451 B1 * | 4/2001 | Kooy | F16F 1/123 464/64.1 |
| 6,672,565 B2 | 1/2004 | Russell | |
| 6,835,084 B2 | 12/2004 | Poon et al. | |
| 7,055,812 B2 | 6/2006 | Balsells | |
| 7,538,289 B2 | 5/2009 | Carroll | |
| 7,722,415 B2 | 5/2010 | Changsrivong | |
| 7,914,315 B2 | 3/2011 | Kuhn et al. | |
| 7,914,351 B2 | 3/2011 | Balsells et al. | |
| 7,985,105 B2 | 7/2011 | Balsells | |
| 8,052,459 B2 | 11/2011 | Smith et al. | |
| 8,096,842 B2 | 1/2012 | Poon et al. | |
| 8,308,167 B2 | 11/2012 | Balsells et al. | |
| 8,336,864 B2 | 12/2012 | Noh | |
| 8,382,532 B2 | 2/2013 | Sjostedt et al. | |
| 8,491,346 B2 | 7/2013 | Sjostedt et al. | |
| 8,561,274 B2 | 10/2013 | Balsells | |
| 8,590,867 B2 | 11/2013 | Leon | |
| 9,004,805 B2 | 4/2015 | Changsrivong et al. | |
| 9,267,526 B2 | 2/2016 | Balsells | |
| 9,273,742 B2 | 3/2016 | Balsells et al. | |
| 9,284,970 B2 | 3/2016 | Dilmaghanian et al. | |
| 9,312,630 B2 | 4/2016 | Huang | |
| 9,482,255 B2 | 11/2016 | Changsrivong et al. | |
| 9,500,211 B2 | 11/2016 | Changsrivong | |
| 9,518,626 B2 | 12/2016 | Balsells et al. | |
| 9,534,625 B2 | 1/2017 | Balsells | |
| 9,677,587 B2 | 6/2017 | Changsrivong et al. | |
| 2002/0122690 A1 | 9/2002 | Poon et al. | |
| 2003/0096526 A1 | 5/2003 | Balsells | |
| 2004/0070128 A1 * | 4/2004 | Balsells | F16F 1/045 267/180 |
| 2004/0245686 A1 * | 12/2004 | Balsells | F16B 21/18 267/1.5 |
| 2005/0234521 A1 * | 10/2005 | Balsells | A61N 1/3752 607/37 |
| 2005/0242910 A1 * | 11/2005 | Balsells | H01R 13/187 335/220 |
| 2006/0228166 A1 | 10/2006 | Balsells | |
| 2007/0037456 A1 * | 2/2007 | Burgess | H01R 13/33 439/841 |
| 2009/0039728 A1 * | 2/2009 | Balsells | H01R 13/187 310/252 |
| 2010/0029145 A1 * | 2/2010 | Balsells | H01R 13/03 439/827 |
| 2010/0090379 A1 * | 4/2010 | Balsells | F16B 21/18 267/1.5 |
| 2010/0279558 A1 * | 11/2010 | Leon | H01R 13/17 439/817 |
| 2010/0289198 A1 * | 11/2010 | Balsells | B21F 35/00 267/151 |
| 2011/0062640 A1 * | 3/2011 | Leon | B21F 1/00 267/166 |
| 2011/0263164 A1 * | 10/2011 | Lenhert | F16F 1/045 439/816 |
| 2011/0281475 A1 * | 11/2011 | Zhang | H01H 1/06 439/816 |
| 2011/0281476 A1 * | 11/2011 | Sjostedt | H01R 13/187 439/840 |
| 2012/0174398 A1 * | 7/2012 | Rust | H01R 13/33 29/876 |
| 2013/0149031 A1 | 6/2013 | Changsrivong et al. | |
| 2014/0130329 A1 | 5/2014 | Changsrivong et al. | |
| 2014/0131932 A1 * | 5/2014 | Balsells | F16F 1/045 267/167 |
| 2014/0162487 A1 | 6/2014 | Frederick et al. | |
| 2014/0219713 A1 * | 8/2014 | Balsells | B21F 3/12 403/327 |
| 2014/0259617 A1 * | 9/2014 | Kompa | F16F 1/045 29/450 |
| 2014/0378008 A1 | 12/2014 | Young et al. | |
| 2015/0018909 A1 * | 1/2015 | Rebentisch | A61N 1/36 607/116 |
| 2015/0240900 A1 * | 8/2015 | Poon | F16F 1/045 267/167 |
| 2015/0316115 A1 | 11/2015 | Carter | |
| 2016/0076568 A1 | 3/2016 | Dilmaghanian et al. | |
| 2016/0204557 A1 | 7/2016 | Kim | |
| 2016/0265574 A1 | 9/2016 | Ghasiri | |
| 2017/0352984 A1 | 12/2017 | Changsrivong et al. | |
| 2017/0373425 A1 | 12/2017 | Rust | |

FOREIGN PATENT DOCUMENTS

| | | |
|---|---|---|
| GB | 2194298 | 3/1988 |
| WO | WO 03067713 | 8/2003 |

OTHER PUBLICATIONS

Examiner's Report on corresponding foreign application (EP Application No. 151661683) from the European Patent Office dated Jul. 21, 2017.

Examiner's Report on corresponding foreign application (EP Application No. 151661683) from the European Patent Office dated Mar. 13, 2018.

* cited by examiner

NESTED CANTED COIL SPRINGS, APPLICATIONS THEREOF, AND RELATED METHODS

FIELD OF ART

The present disclosure generally relates to canted coil springs and related methods, and more particularly, to apparatuses, applications, and methods involving multiple canted coil springs nested together.

BACKGROUND

A conventional canted coil spring comprises a plurality of coils interconnected with one another wherein the coils are disposed at a preselected angle, such as being canted, with respect to a centerline. The preselected angle causes said plurality of coils to have an elliptical shape when viewed in the direction of the centerline. The coils each comprises a major axis and a minor axis, wherein coil deflection only occurs along said minor axis and typically only along the preselected angle from a first canting position to a further or second canting position. The canted nature of the canted coil spring allows for deflection of the coils along the minor axis when a force perpendicular in direction to the centerline is applied. The deflection force of the canted coil spring is relatively constant with respect to the deflection of the plurality of coils along a range of deflection, also known as working deflection range. Such feature brings significant advantages when applied in applications such as rotary/static seals and electrical connectivity. Also, due to the various sizes of canted coil springs, applications using a canted coil spring may achieve compact designs while producing the desired results.

SUMMARY

Aspects of the present disclosure include a spring assembly which can comprise at least two canted coil springs including a first canted coil spring with a coil centerline and a second canted coil spring with a coil centerline, each canted coil spring can comprise a plurality of coils, wherein at least two sections of coils of the first canted coil spring can each be positioned between two adjacent coils of the second canted coil spring, and each section of the coils of the first canted coil spring and the second canted coil can comprise at least one coil, and wherein the coil centerline of the first canted coil spring and the coil centerline of the second canted coil spring can be located side-by-side relative to a point of reference, can be common relative to a point of reference, or the coil centerline of the first canted coil spring (200) can be located below the coil centerline of the second canted coil spring (300) relative to a point of reference. The spring assembly can include one or more of the following:

At least half of the coils of the first canted coil spring can each be positioned between two adjacent coils of the second canted coil spring.

More than one coil of the second canted coil spring can be positioned between two adjacent coils of the first canted coil spring.

The coils of the second canted coil spring can each be positioned between two adjacent coils of the first canted coil spring.

A wire cross section of the first canted coil spring can be different than a wire cross section of the second canted coil spring.

A shape of the cross section of the wire of the first canted coil spring can be different than a shape of the cross section of the wire of the second canted coil spring.

A material of a wire of the first canted coil spring can be different than a material of a wire of the second canted coil spring.

A size of the coils of the first canted coil spring can be different than a size of the coils of the second canted coil spring.

A size of the coils of the at least two canted coil springs can refer to a cross sectional area of the coil.

A shape of the coils of the first canted coil spring can be different than a shape of the coils of the second canted coil spring.

A pitch of the first canted coil spring can be different than a pitch of the second canted coil spring.

A plurality of the coils of a third canted coil spring can each be positioned between two adjacent coils of the second canted coil spring.

The plurality of coils of the third canted coil spring may not be positioned between the coils of the first canted coil spring.

The back or front angle of the coils of the first canted coil spring can be different than the back or front angle of the coils of the second canted coil spring.

The first canted coil spring can be oriented radially and the second canted coil spring can be oriented axially.

A turn angle of the coils of the first canted coil spring i can be different than a turn angle of the coils of the second canted coil spring.

A total spring force of the spring assembly can be at least 1.6 times or twice the spring force provided by the first canted coil spring or the second canted coil spring.

The first canted coil spring can be a spring ring and the second canted coil spring can be a spring ring.

The first canted coil spring can have a spring ring and the second canted coil spring can have a spring ring, wherein the coil centerline of the first canted coil spring and the coil centerline of the second canted coil spring can be located side-by-side relative to the ring centerline of the first canted coil spring or the second canted coil spring, can be common compared to the ring centerline of the first canted coil spring or the second canted coil spring, or the coil centerline of the first canted coil spring can be closer to the ring centerline of the first canted coil spring or the second canted coil spring than the coil centerline of the second canted coil spring.

At least one of the at least two canted coil springs can have a non-circular shape.

At least two canted coil springs can be rings with different inner diameters, different outer diameters, or both different inner and outer diameters.

At least one of the canted coil springs can be made from a non-metallic material.

A non-metallic material can be PEEK.

Another aspect of the present disclosure includes a spring assembly which can comprise at least one canted coil spring comprising a plurality of coils and at least one helical spring comprising a plurality of coils, wherein at least half of the coils of one of the at least one canted coil spring and at least one helical spring can each be positioned between two adjacent coils of the other one of the at least one canted coil spring and the at least one helical spring.

Yet another aspect of the present disclosure includes a spring assembly which can comprise at least one canted coil spring comprising a plurality of coils and at least one ribbon spring comprising a plurality of coils, wherein at least half of the coils of one of the at least one canted coil spring and at least one ribbon spring are each positioned between two adjacent coils of the other one of the at least one canted coil spring and the at least one ribbon spring.

Still yet another aspect of the present disclosure includes a connector assembly which can comprise a housing with a housing groove, a shaft with a shaft groove, the housing groove and the shaft groove define a common groove, and a spring assembly positioned in the common groove to latch the shaft to the housing.

The spring assembly can engage the housing with the shaft, and can comprise at least two canted coil springs, each canted coil spring can comprise a plurality of coils, wherein at least two sections of coils of one of a first canted coil spring or a second canted coil spring of the at least two canted coil springs can each be positioned between two adjacent coils of the other of the second canted coil spring or the first canted coil spring of the at least two canted coil springs, wherein each section of the coils of the first canted coil spring and the second canted coil can comprise at least one coil.

Another aspect of the present disclosure includes a method of nesting at least two canted coil springs together to produce a spring assembly that can approximately double the removal force associated with one of the two nested canted coil springs. Such increase in the removal force is not only due to the presence of more coils per unit length but also due to the interference between the two springs that have been nested together, that is, due to the frictional forces generated between the coils of the two canted coil springs when the coils deflect.

A further aspect of the present disclosure is a method of increasing a spring assembly's resistance to deflection by nesting a first spring length with a second spring length. The first and second spring lengths can be elongated lengths with the ends of each length not connected or can be spring rings with the ends of each length connected.

A further aspect of the present disclosure is a method of increasing a spring assembly's resistance to deflection by partially or fully nesting a first spring length with a second spring length. A method of increasing a spring assembly's resistance to deflection is also provided that comprises increasing the spring assembly's width or height profile by only partially nesting the first and second spring lengths together so that the overall dimensional profile of the spring assembly is increased compared to a single spring length.

DESCRIPTION OF DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the embodiments of canted coil springs and canted coil spring applications provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

The canted coil springs of the present disclosure may be made from any number of metallic wire materials and alloys and may include cladding, platings, or multi-layers, such as being formed from a wire having a core and one or more outer layers surrounding the metallic core, which can be hollow or solid. The canted coil springs can also be made from a plastic or a non-metallic material, such as polyether ether ketone ("PEEK") or other engineered plastics.

Figure 1:
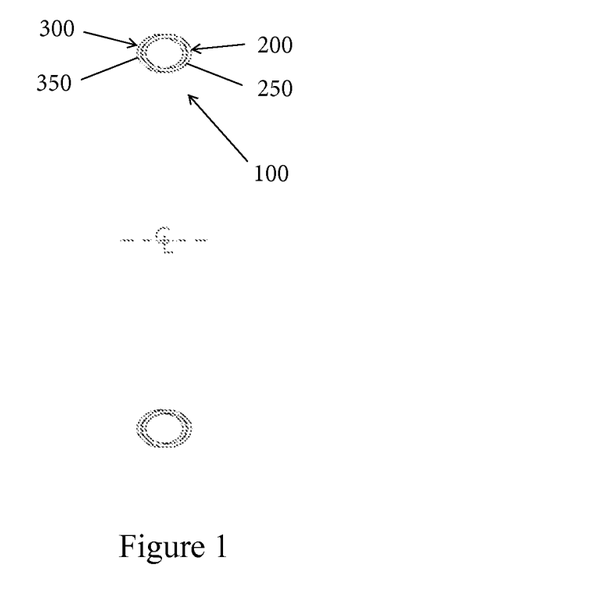
FIG. 1 shows an embodiment of a spring assembly comprising two radial canted coil spring nested together.

With reference now to FIG. 1, a spring assembly 100 of the present disclosure can comprise of two or more canted coil spring lengths each comprising a plurality of canted coils and wherein the two lengths are nested together. Each spring length can be a length of spring in which the ends of the spring length are not connected or are connected to form a spring ring. The coils can deflect along a direction perpendicular to a centerline through the coils, such as along the minor axes of the coils or along the heights of the coils, of the canted coil spring. The two or more canted coil spring lengths can be nested together to form the spring assembly 100. In some embodiments, one of the two or more canted coil spring lengths can be replaced with at least one helical spring, at least one ribbon spring, or other spring types.

The two or more canted coil springs of the spring assembly 100 can be fixed together at one or more various points of contacts, such as by welding at contact points of the coils from the different spring lengths, or allowed to slide freely relative to one another. Fixing the two or more canted coil springs can prevent one or more adjacent canted coil springs from moving relative to the other. The two or more canted coil springs can be fixed together by friction, welds at various contact points, using adhesive, mechanical means, or by other conventional joining techniques.

The number of spring lengths, which can be a combination of two or more canted coil spring lengths, at least one canted coil spring length and one or more helical springs or ribbon springs, and the positions of the spring lengths relative one another in the spring assembly 100 can be dependent on the width of a groove receiving the spring assembly 100 and the application utilizing the spring assembly 100, among others. The positions can also be dependent on the extent of nesting and whether the nested spring lengths are fixed relative to another or allowed to move. In some examples, the application may require at least twice the removal force associated with a typical canted coil spring to disconnect a pin from a housing. The pin and the housing can each comprise a groove and together retain the spring ring therebetween in a latched position prior to separation or disconnection. The spring assembly 100 can increase the removal force to remove the pin from the housing due to the presence of more coils per unit length and the interference between the two nested springs of the present spring assembly 100. The interference and nested configuration of the springs increase the frictional force generated between the coils of the adjacent canted coil springs when the coils deflect. That is, when holding the housing and moving the pin relative to the housing, the force to remove the pin from the housing is increased due to the presence of more coils per unit length over a typical non-nested canted coil spring ring and due to the other factors, such as frictional force generated between the coils of the adjacent canted coil springs and whether one ring is fixed relative to the other or allowed to move. The total frictional force can be determined by many intrinsic and extrinsic factors, which can include the number of coils between adjacent canted coil springs, coefficient of friction between the coils such as roughness of the spring surfaces, and material properties of the canted coil springs such as the modulus of elasticity.

Another factor that can affect the removal force in a connector application involving a housing and a pin capturing a spring assembly 100 of the present disclosure in between a common groove can include the deflection of the spring assembly 100. As used herein, a pin groove and a housing groove aligning to capture a spring assembly therebetween may be referred to as a common groove. For example, if there are greater frictional forces, the resistance of the deflection of the spring assembly 100 can increase and greater resistance to deflection of the spring assembly 100 experienced. The removal force to remove the pin from the housing can also correspondingly increase.

Figure 5:
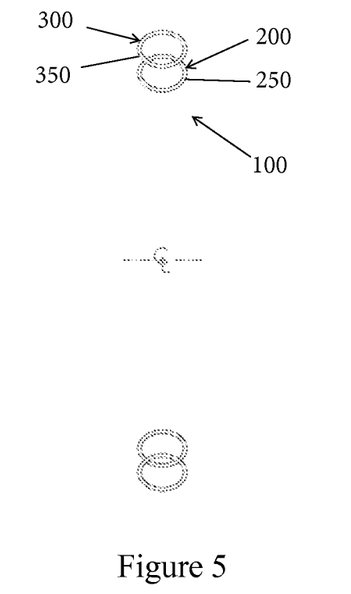
FIG. 5 shows yet another embodiment of a spring assembly comprising two radial canted coil springs partially nested together.
Figure 6:
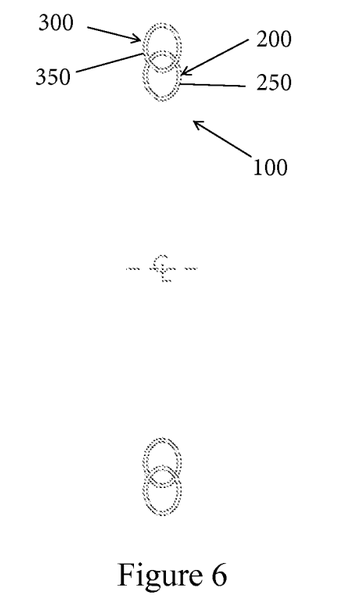
FIG. 6 shows yet another embodiment of a spring assembly comprising two axial canted coil springs partially nested together.
Figure 7:
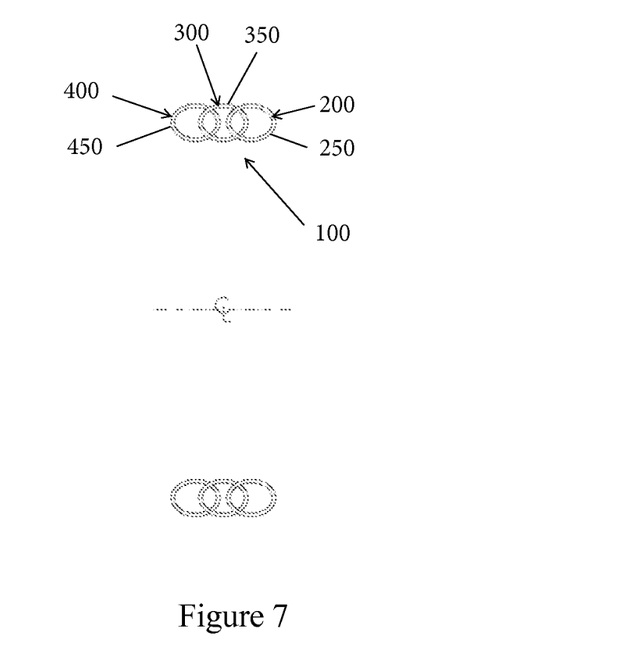
FIG. 7 shows still yet another embodiment of a spring assembly comprising more than two radial canted coil springs nested together.
Figure 8:
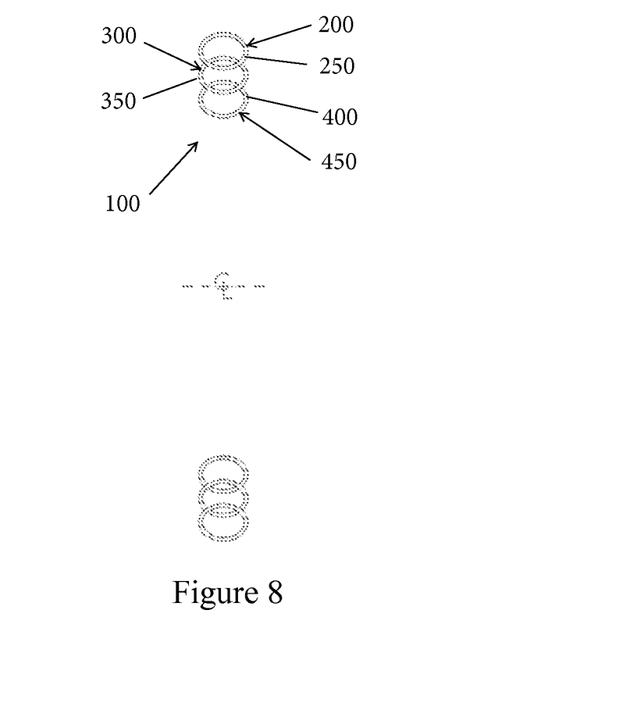
FIG. 8 shows still yet another embodiment of a spring assembly comprising more than two axial canted coil springs nested together.

Figures ("FIGS.") 1-10 illustrates embodiments of the spring assembly 100 comprising at least two canted coil spring lengths or simply canted coil springs, which includes a first canted coil spring 200 and a second canted coil spring 300 nested with the first canted coil spring 200. Although only the first canted coil spring 200 and the second canted coil spring 200 are shown and described, additional canted coil springs may be included in the spring assembly 100 of FIGS. 1-10, such as shown in FIGS. 7 and 8. The following descriptions of the canted coil springs can extend to other canted coil spring types and/or other springs that can be included with, such as nested with, a canted coil spring in the spring assembly 100. Further, a helical spring, a ribbon spring, or other spring can replace the first canted coil spring 200, the second canted coil spring 300, or any additional canted coil spring, in the following discussions of canted coil springs and applications thereof. Still further, rather than replacing a canted coil spring, a spring length of any non-canted coil spring can be added and nested to form the spring assembly of the present disclosure.

As noted herein, the terms "first" and "second" are used to distinguish or keep track of one spring length from another spring length only and are not intended to be structurally limiting unless the context indicates otherwise.

The spring assembly 100 is shown as a spring ring in which the ends of the nested spring lengths are connected and the spring ring of the spring assembly 100 having a ring centerline ℄. The first canted coil spring 200 comprises a plurality of coils 250 (only two shown). The plurality of coils 250 of the first canted coil spring length 200 can be identical or different in size or shape. The second canted coil spring length 300 comprises a plurality of coils 350 (only two shown), which can also be identical or different in size and shape and can be the same or different to the coils 250 of the first canted coil spring 200. The number of coils 250 of the first canted coil spring 200 can also be different than or the same as the number of coils 350 of the second canted coil spring 300. The two spring lengths 200, 300 can be made from the same material or from different materials, including from the same or different outer claddings.

The outer diameter or perimeter and the inner diameter or perimeter of the nested spring lengths 200, 300 of the spring assembly 100 can be the same or different from each other. The coils of the nested spring lengths can also have the same coil height and coil width or different coil heights and coil widths. In an example, the first canted coil spring 200 can have the same inner diameter, a smaller outer diameter, and a smaller coil width than the second canted coil spring 300. When placed in a common groove, the exemplary spring assembly 100 will deflect, such as cant, garter, or rotate, or a combination thereof, and will have an overall spring characteristics that is a combination of spring characteristics of the first canted coil spring 200 and the second canted coil spring 300. The overall size of each canted coil spring 200, 300 can vary to accommodate the application and requirements of the spring assembly 100. For example, the two spring lengths can be partially nested to produce a relatively wide profile to fit into a certain groove or be fully nested to produce a relatively narrower profile to fit into a groove of smaller width.

The coils 250 of the first canted coil spring 200 can nest between the coils 350 of the second canted coil spring 300 in any pattern to form at least a part of the spring assembly 100. For example, the coils 250 of the first canted coil spring 200 can nest in alternating pattern with the coils 350 of the second canted coil spring. In other examples, due to differences in the number of coils, each coil 250 of the first canted coil spring 200 can nest in between every two or more coils 350 of the second canted coil spring 300.

Figure 3:
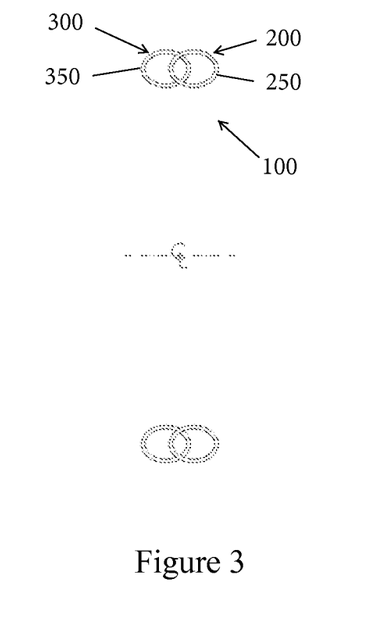
FIG. 3 shows another embodiment of a spring assembly comprising two radial canted coil springs partially nested together.

In FIGS. 1, 3, and 5, the nested first and second canted coil springs 200, 300 can be radial canted coil springs, although other spring types can be used. FIG. 1 illustrates a spring assembly 100 with the first canted coil spring 200 and the second canted coil spring 300 nested side by side closely together so that the coil centerlines of the two springs 200, 300 are generally common or co-axial. FIG. 3 is similar to FIG. 1, but shown with the first canted coil spring 200 and the second canted coil spring 300 partially nested side-by-side further apart so the two coil centerlines of the two canted coil springs 200, 300 are spaced from one another, in a side-by-side configuration with both coil centerlines being generally spaced equally from the spring ring centerline ₵. FIG. 5 shows the spring assembly 100 with the first canted coil spring 200 and the second canted coil spring 300 partially nested together resulting in a larger overall outer diameter and a smaller overall inner diameter. The two coil centerlines of the two canted coil springs 200, 300 in the FIG. 5 embodiment are spaced from one another, in a vertically spaced configuration with one coil centerline being closer to the spring ring centerline ₵ and the other coil centerline being further away from the spring ring centerline ₵.

Figure 2:
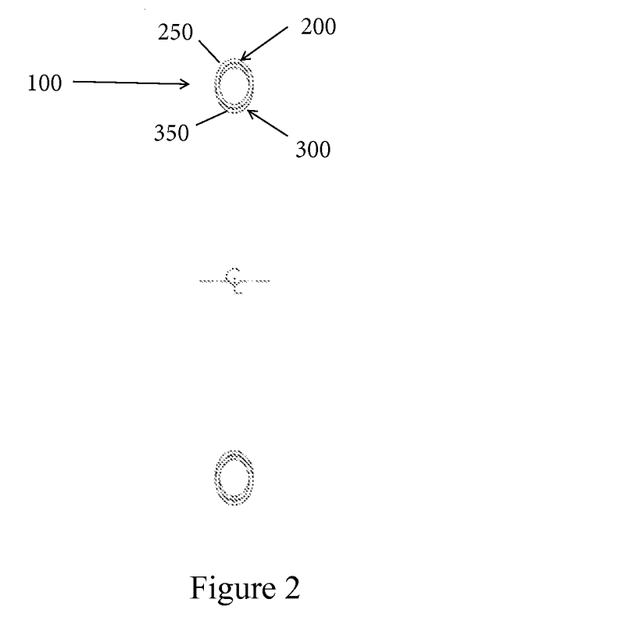
FIG. 2 shows an embodiment of a spring assembly comprising two axial canted coil springs nested together.
Figure 4:
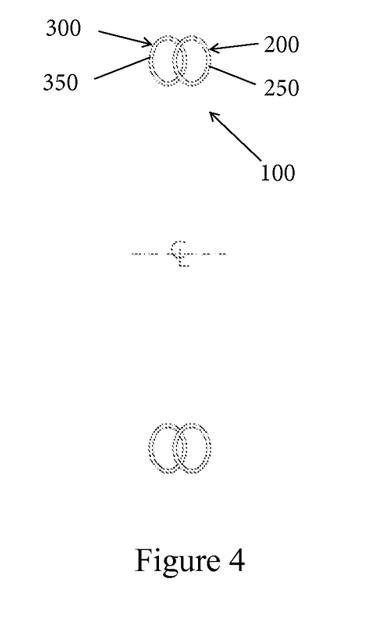
FIG. 4 shows another embodiment of a spring assembly comprising two axial canted coil springs partially nested together.

In FIGS. 2, 4, and 6, the nested first and second canted coil springs 200, 300 can be axial canted coil springs, although other spring types can be used. FIG. 2 illustrates a spring assembly 100 with the first canted coil spring 200 and the second canted coil spring 300 nested side by side closely together resulting in a slightly larger overall outer diameter and a slightly smaller overall inner diameter. The coil centerlines of the two springs 200, 300 are generally common or co-axial and spaced from the spring ring centerline ₵ at about the same distance. FIG. 4 shows the spring assembly 100 with the first canted coil spring 200 and the second canted coil spring 300 partially nested in the axial direction relative to the spring ring centerline. The two coil centerlines of the two canted coil springs 200, 300 of FIG. 4 are spaced from one another, in a side-by-side configuration with both coil centerlines being generally spaced equally from the spring ring centerline ₵. The spring assembly 100 of FIG. 6 is similar to the spring assembly of FIG. 5 but using axial canted coil springs. That is, the spring assembly is configured to deflect or cant in the same direction as the spring ring centerline ₵. The first canted coil spring 200 and the second canted coil spring 300 are partially nested in the radial direction relative to the spring ring centerline ₵ such that one coil centerline is closer to the spring ring centerline ₵ and the other coil centerline is further away from the spring ring centerline ₵ resulting in a larger overall outer diameter and a smaller overall inner diameter compared to a spring assembly utilizing a single spring ring.

When two coil lengths are nested to form the spring assembly 100 of the present disclosure, the coils 250, 350 of the first canted coil spring 200 and the second canted coil springs 300 can alternate in a number of different patterns. For example, the coils 250, 350 can alternate in the following exemplary patterns with the numbers representing the coil type in a coil pattern and when viewing along the line of sight of the ring centerline ₵: (1) 250, 350, 250, 350, etc., (2) 250, 250, 350, 350, 250, 250, 350, 350, etc. (3) 250, 350, 350, 250, 350, 350, 250, 250, 350, etc., (3) 250, 350, 350, 250, 250, 350, 350, 250, 350, etc., (4) 250, 350, 350, 250, 250, 350, 350, 250, 350, 250, 250, 250, 350, 350, etc. Other coil and pattern sequences are contemplated. For example, if a third spring length, such as a third canted coil spring, is nested with the first canted coil spring 200 and the second canted coil spring 300, the coils can alternate in different patterns. The coils can alternate in different patterns than described even with just two nested spring rings.

In an example, the spring assembly 100 can have a first canted coil spring 200 with forty coils 250 and a second canted coil spring 300 with twenty coils 350, with the first canted coil spring 200 having ten sections of four coils 250 in each section, and the second canted coil spring 300 having ten sections of two coils 350 in each section. Each section of the first canted coil spring 200 could then be positioned adjacent to a section of the second canted coil spring 300. Thus, in this example, each section of the first canted coil spring 200 can be positioned between two adjacent coils 350 of the second canted coil spring 300. Alternatively, the sections of either the first or the second canted coil spring 200, 300 can have a different number of coils 250, 350 from the other and a different number of sections, such that when nested together it is not entirely uniform or only uniform along a portion of the spring assembly 100.

In another example, at least half of the coils 250 of the first canted coil spring 200 can each be positioned between two adjacent coils 350 of the second canted coil spring 300. That is, in this example, the first canted coil spring 200 has half or at least half of the coils 250 individually intertwined with the coils 350 of the second canted coil spring 300. This ensures a greater than 50 percent connection between the individual canted coil springs 200, 300.

In one configuration, if the spring assembly 100 has a third canted coil spring 400, half or at least half of the coils 450 of a third canted coil spring 400 can each be positioned between two adjacent coils of the first canted coil spring 200 or the second canted coil spring 300.

In another configuration, if the spring assembly 100 has a third canted coil spring 400, the coils 450 of the third canted coil spring 400 can be positioned such that the coils 450 of the third canted coil spring 400 are not positioned between the coils of the first canted coil spring 200. Thus, in this configuration, only the coils 350 of the second canted coil spring 300 are positioned between the coils 250, 450 of both the first canted coil spring 200 and the third canted coil spring 400. Said differently, the second canted coil spring 300 is nested between the first canted coil spring 200 and the third canted coil spring 400 but the first canted coil spring 200 and the third canted coil spring 400 are not nested together. Alternatively, all three coils can be fully nested. When three coil lengths 200, 300, 400 are nested to form the spring assembly 100 of the present disclosure, the coils 250, 350, 450 of the first canted coil spring 200, the second canted coil springs 300, and the third canted coil spring 400 can alternate in a number of different patterns. For example, the coils 250, 350, 450 can alternate in the following exemplary patterns with the numbers representing the coil type in a coil pattern type and when viewing along the line of sight of the ring centerline ₵: (1) 250, 350, 450, 250, 350, 450, etc., (2) 250, 250, 350, 350, 450, 450, 250, 250, 350, 350, 450, 450, etc. (3) 250, 350, 450, 350, 250, 350, 450, 350, etc., (3) 250, 450, 250, 350, 250, 450, 250, 350, etc., (4) 250, 350, 350, 450, 450, 250, 350, 350, 450, 450, 250, 350, 350, 450, 450, etc., (5) 250, 350, 250, 350, etc. and 350, 450, 350, 450, etc., (6) 250, 250, 350, 350, etc. and 350, 350, 450, 450, etc., (7) 250, 350, 350, 350, 250, 350, 350, 350, etc. and 450, 350, 350, 450, 350, 350, 350, etc., and (8) 250, 350, 350, 350, 250, 350, 350, 350, etc. and 450, 450, 350, 350, 450, 450, 350, 350, etc. In examples (5)-(8), the second canted coil spring 300 is nested between the first canted coil spring 200 and the third canted coil spring 400 but the first canted coil spring 200 and the third canted coil spring 400 are not nested together.

With reference now to FIG. 7, the spring assembly 100 can comprise a first canted coil spring 200 and a third canted coil spring 400 which can nest with the second canted coil spring 300, but the first canted coil spring 200 and the third canted coil spring 400 are not nested to one another. In other words, the coils of the third canted coil spring 400 and the coils of the first canted coil spring 200 are spaced from another without any overlapping along the coil centerline of the second canted coil spring 300. FIG. 7 shows the three coil lengths 200, 300, 400 in a side-by-side-by-side configuration so that the coil centerline of each spring length is approximately equal when measured to the spring ring centerline ₵. In FIG. 8, the spring assembly 100 can incorporate a first canted coil spring 200 and a third canted coil spring 400 that are not nested to one another but only to the second spring length 300. In other words, the first canted coil spring 200 and the third canted coil spring 400 can nest with the second canted coil spring 300 in the radial direction such that the coil centerline of the third spring length 400 is closest to the spring ring centerline ₵, then the coil centerline of the second spring length 300 is next closest to the spring ring centerline, and the coil centerline of the first spring length 200 is furthest to the spring ring centerline. The coils of the three canted coil spring lengths 200, 300, 400 can be nested in any of the alternating patterns discussed elsewhere herein.

In an example, the nested coil patterns can be selected to provide the overall spring characteristics of the spring assembly 100 with the desired attributes by taking into consideration the characteristics of the individual spring lengths. For example, the second spring length 300 can have a more spaced configuration and fewer number of spring coils per coil length but harder or stiffer coil wire than the first canted coil spring length 200. Further, the fourth canted coil spring length 400 can have a different coil front and/or back angles than the second spring length 300 and can have a different elliptical dimension than the other two spring lengths 200, 300 so that the overall spring characteristics of the spring assembly 100 is a combination of individual attributes of the individual spring lengths. The manner in which the coils are nested when forming the spring assembly 100 of the present disclosure can be selected based on friction force, coil contacts, overall coil width, and overall coil height, among others. For example, FIG. 7 is selected with an overall coil width that is wider than a coil width of a single spring length for use with a pin groove, a housing groove, or both in which the groove width is relatively wide for a single spring length. FIG. 8 is selected with an overall coil height that is larger than a coil height of a single spring length for use with a pin groove, a housing groove, or both in which the groove depth is relatively deep for a single spring length.

The coils of the two or more spring lengths can be nested to form a spring assembly 100 of the present disclosure having an equivalent frictional force that is greater than the frictional force of any of the individual spring lengths. Thus, when used in a connector application comprising a pin and a housing and the spring assembly 100 is caused to cant from one canting position to a further canting position upon separation of the pin from the housing, a greater resistance is experienced during the separation process, which in turn can correspond to a greater removal force utilizing the spring assembly 100 of the present disclosure. Other factors can contribute to the coils' resistance to deflection and can include the physical size and material properties of the canted coil springs making up the spring assembly 100 of the present disclosure.

As understood in the field of latching connector applications, after a canted coil spring is captured in a common groove, the coils of the spring assembly adjust or settle into the available volume of the common groove and the coils of the spring assembly, in the latched position, have latched canting angles. In other words, in the latched position, the coils are canted to a certain canting angle, which can be the same or vary from coil to coil. If two or more different coil lengths are nested to form the spring assembly 100, the coils of each of the spring lengths can have similar or different canting angles depending on the number, size, and shape of the individual coils but each coil can comprise a specific canting angle when in the latched position in the common groove, called a latched coil canting angle. To separate the pin from the housing so that the pin groove is moved away from the housing groove and the common groove is no more, the coils will be deflected from the latched coil canting angle to a further canted angle to permit the pin groove to slide away from the spring assembly, assuming the spring assembly is housing mounted. If the spring assembly is pin mounted, the housing groove will slide away from the spring assembly during the separation. In the further canted angle during the disconnection process, the coils will deflect along their minor axes and will have a flatter or a more flattened profile when looking down the coil centerline. The further canting is required to provide clearance for the housing groove or the pin groove to separate from the spring assembly.

Each canted coil spring of the nested spring lengths of the spring assembly 100 can be formed from one or more wires. In one embodiment, a size of the cross section of the wire of each of the at least two canted coil springs can be different from each other. For example, a size of the cross section of the wire of the first canted coil spring 200 can be different than a size of the cross section of the wire of the second canted coil spring 300. In another embodiment, a size of the cross section of the wire of each of the at least two canted coil springs can be the same or similar to each other. In yet another embodiment, if there are three or more canted coil springs of the spring assembly, then a size of the cross section of the wire of each canted soil spring can be the same as each other, different from each other, or a combination of both.

Each canted coil spring of the nested spring lengths of the spring assembly 100 can also be formed from one or more wires with a uniform or non-uniform shape. In one embodiment, a shape of the cross section of the wire of the at least two canted coil springs can be different from each other. For example, a shape of the cross section of the wire of the first canted coil spring 200 can be different than a shape of the cross section of the wire of the second canted coil spring 300. In another embodiment, a shape of the cross section of the wire of each of the at least two canted coil springs can be the same with each other. In yet another embodiment, if there are three or more canted coil springs in the spring assembly 100, then a shape of the cross section of the wire of each canted coil spring can be the same as each other, different from each other, or a combination of both. For example, one spring length can be formed from a round wire and another spring length can be formed from a square wire, an oval wire, a rectangular wire, or a polygonal shaped wire.

A material of the wire forming each canted coil spring of the spring assembly 100 can be different from each other, the same, or a combination of both. For example, a material of the wire of the first canted coil spring 200 can be different than a material of the wire of the second canted coil spring 300.

A size of the wire forming each canted coil spring of the spring assembly 100 can be different from each other, the same, or a combination of both. The size of the wire can correspond to the cross-sectional size of the wire, such as the diameter of the wire if the wire was round.

A size of the coils of each canted coil spring of the spring assembly 100 can be different from each other, the same, or a combination of both. For example, a size of the coils 250 of the first canted coil springs 200 can be different than a size of the coils of the second canted coil spring 300. The size of the coil can refer to a cross sectional area of the coil.

The shape of the coils of each canted coil spring of the spring assembly 100 can be different from each other, the same, or a combination of both. Furthermore, within each canted coil spring length, the shape of the coils can be different from each other, the same, or a combination of both. In one example, a shape of the coils of the first canted coil spring 100 can be different than a shape of the coils of the second canted coil spring 200. The shape of the coils can be, for example, circular, elliptical, rectangular, polygonal, regular, or irregular.

Figure 9:
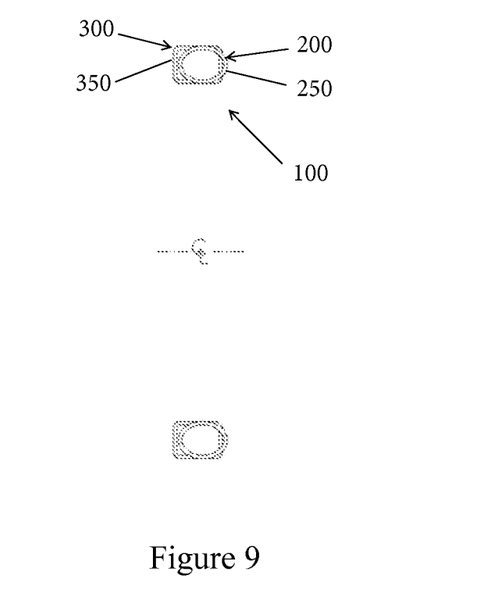
FIG. 9 shows an embodiment of a spring assembly comprising two canted coil springs nested together, one of the two canted coil springs having a non-circular coil cross section.
Figure 10:
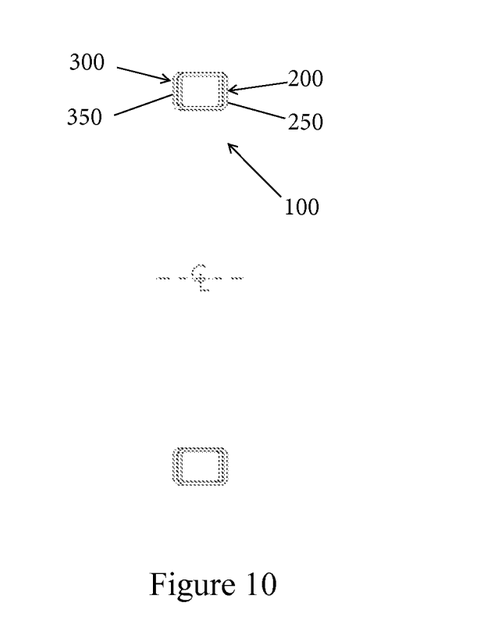
FIG. 10 shows an embodiment of a spring assembly comprising two canted coil springs nested together, both of the two canted coil springs having a non-circular coil cross section.
Figure 11:
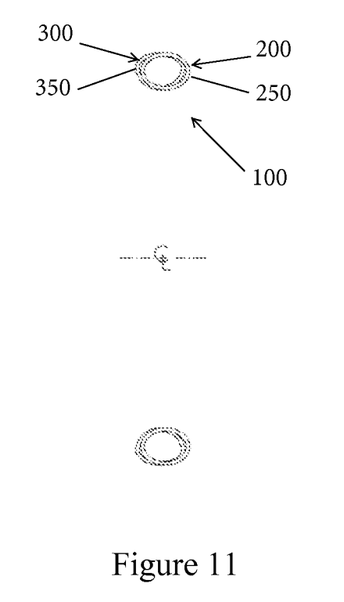
FIG. 11 shows another embodiment of a spring assembly comprising two canted coil springs nested together, one of the two canted coil springs having a non-circular coil cross section.
Figure 12:
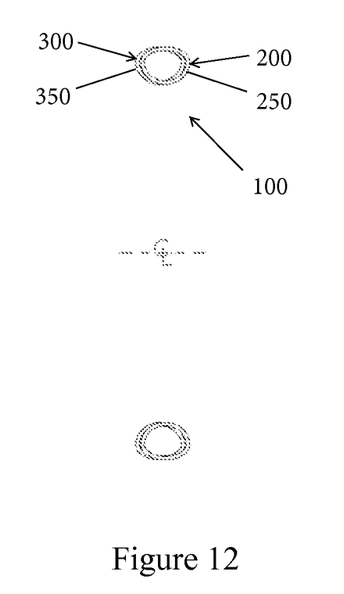
FIG. 12 shows another embodiment of a spring assembly comprising two canted coil springs nested together, both of the two canted coil springs having a non-circular coil cross section.

For example, in FIG. 9, the spring assembly 100 can comprise a circular first canted coil spring 200 nested with a rectangular second canted coil spring 300. Referring to FIG. 10, the spring assembly 100 can comprise a rectangular first canted coil spring 200 nested with a rectangular second canted coil spring 300. In FIG. 11, the spring assembly 100 can comprise a circular first canted coil spring 200 nested with an irregular shaped second canted coil spring 300. Referring to FIG. 12, the spring assembly 100 can comprise an irregular shaped first canted coil spring 200 nested with an irregular shaped second canted coil spring 300 in the axial direction.

A pitch between the coils of each canted coil spring length of the nested spring lengths of the spring assembly 100 can be different from each other, the same, or a combination of both. For example, a pitch of the first canted coil spring 200 within the spring assembly 100 can be different than a pitch of the second canted coil spring 300 within the spring assembly 100. The pitch of the coils of the spring assembly 100 can also be uniform or non-uniform. In an example, a pitch of a canted coil spring defines a number of coils per unit length.

The angle of the coils of a spring length of the nested spring lengths in the spring assembly 100 and the back angle, front angle, or both of the coils between the canted coil springs of the spring assembly 100 can affect the removal force of a pin from a housing in a connector application using the spring assembly 100 of the present disclosure. The back angle can provide the means for both defining the orientation of the trailing portion of each coil with respect to a normal line and for determining the working resilient range of the spring. The front angle can provide the means for defining the orientation of the leading portion of the coil with respect to a normal line.

In one embodiment, the back angle, the front angle, or both the front and back angles of the coils of the at least two canted coil springs can be the same, different, or a combination of both same and different, from each other. In one example, the back angle or front angle of the coils 250 of the first canted coil spring 200 can be different than the back angle or front angle of the coils 350 of the second canted coil spring 300. In another example, the back angle or front angle of the coils 250 of the first canted coil spring 200 can be the same as the back angle or front angle of the coils 350 of the second canted coil spring 300.

The canted coil springs of the spring assembly 100 can be a radially oriented spring, an axially oriented spring, or a canted coil spring which can deflect along one or more directions perpendicular to a centerline through the coils of the canted coil spring, such as the multi-deflection canted coil springs disclosed in U.S. patent application Ser. No. 14/630,361, filed Feb. 24, 2015, the contents of which are expressly incorporated herein by reference. In an example, the first canted coil spring 200 can be oriented radially and the second canted coil spring 300 can be oriented axially. In another example, the first canted coil spring 200 can be oriented axially and the second canted coil spring 300 can be oriented radially. In yet another example, the first canted coil spring 200 and the second canted coil spring 300 can both be oriented either axially or radially.

A turn angle of the coils of each canted coil spring length of the nested spring lengths can also affect the deflection of the spring assembly 100. In one embodiment, a turn angle of the coils of the first canted coil spring 200 can be different than a turn angle of the coils of the second canted coil spring 300. A turn angle of a coil can be understood to be a rotation of the coil's major axis and minor axis from their normal radial canted coil spring position if the coil is part of a radial canted coil spring or from their normal axial canted coil spring position if the coil is part of an axial canted coil spring.

Each canted coil spring of the nested canted coil spring lengths can have a spring force in the axial direction, radial direction, or any one or more directions perpendicular to a centerline through the coils of the canted coil spring. When two or more canted coil spring lengths are nested together to form the spring assembly 100, a total spring force of the spring assembly 100 in a particular direction is higher than the individual spring forces of the individual canted coil spring length used to form the spring assembly for that particular direction. In an example, the total spring force of the spring assembly 100 when deflected in a particular direction is at least 60% more than the spring force provided by any of the individual nested canted coil spring lengths of the spring assembly 100 for that particular direction. In one embodiment, a total spring force of the spring assembly 100 for a particular deflection can be at least 1.6 times the spring force of any one of the two or more nested canted coil spring lengths used to form the spring assembly 100. In some examples, the total spring force for a particular deflection of the spring assembly 100 can be at least 1.65 times to at least 2 times the spring force of any one of the two or more nested canted coil spring lengths used to form the spring assembly 100. Because of interference between the nested coils, the total spring force for a particular deflection can be greater than 2 times the spring force of any one of the two or more nested canted coil spring lengths used to form the spring assembly 100.

The canted coil springs of the spring assembly 100 can embody a ring shape having a circular shape or a non-circular shape with the ends of the nested spring lengths joined together. Further, each canted coil spring length of the nested spring lengths forming the spring assembly 100 can be a ring having the same shape or a different shape from each other, or a combination of both. In one example, the canted coil springs of the spring assembly 100 can be rings which can be circular but is not limited to having a circular shape. In another example, at least one of the canted coils spring lengths of the spring assembly 100 can have a non-circular shape.

Each canted coil spring length of the nested canted coil spring lengths of the spring assembly 100 can also be rings with different inner diameters, different outer diameters, or both different inner and outer diameters.

In some examples, the spring assembly 100 formed by two or more nested spring lengths can be used as a length rather than a ring. In other words, the ends of the individual spring lengths are not connected to form a ring shape but remained an elongated length, which may be straight or somewhat arcuate.

In other embodiments of the spring assembly 100, the first canted coil spring 200, the second canted coil spring 300, the third canted coil spring 400, or any canted coil spring as described elsewhere herein can be replaced with at least one helical spring or at least one ribbon spring. For example, the spring assembly 100 can comprise at least one canted coil spring nested with at least one helical spring, wherein at least two sections of coils of the at least one helical spring or the at least one canted coil spring can each be positioned between two adjacent coils of the at least one canted coil spring or the at least one helical spring, with each section of the coils of the at least one helical spring or the at least one canted coil spring having at least one coil.

In one example, at least half of the coils of at least one helical spring can each be positioned between two adjacent coils of the at least one canted coil spring. In another example, at least half of the coils of the at least one canted coil spring can each be positioned between two adjacent coils of the at least one helical spring.

In another example, the spring assembly 100 can comprise at least one canted coil spring and at least one ribbon spring, wherein at least two sections of coils of the at least one ribbon spring or the at least one canted coil spring can each be positioned between two adjacent coils of the at least one canted coil spring or the at least one ribbon spring, with each section of the coils of the at least one ribbon spring or the at least one canted coil spring having at least one coil. For example, at least half of the coils of at least one ribbon spring can each be positioned between two adjacent coils of the at least one canted coil spring. In another example, at least half of the coils of the at least one canted coil spring can each be positioned between two adjacent coils of the at least one ribbon spring.

The spring assembly 100 can be formed by bringing together and nesting at least two canted coil spring lengths together, wherein each canted coil spring length can include any canted coil spring described elsewhere herein and in any described configuration.

Alternatively, the spring assembly 100 can be formed by bringing together and nesting at least one canted coil spring length and another spring length together that is not a canted coil spring. The canted coil spring length can include any canted coil spring type, shape, or configuration described elsewhere herein and in described configuration.

Figure 13A:
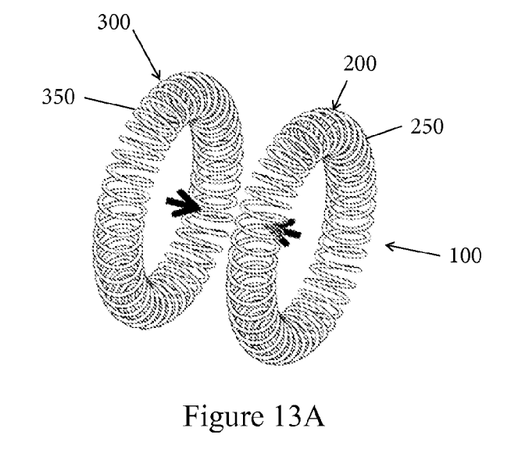
FIGS. 13A and 13B show the process of nesting two radial canted coil springs.

Refer now to FIG. 13A, a first canted coil spring 200 and a second canted coil spring 300, each in a ring configuration, are brought towards each other, as exemplified by the two arrows. The ends of the first canted coil spring 200 and the ends of the second canted coil spring 300 can be joined by welding or by incorporating coil geometries at the two ends of each spring length that cause mechanical engagement without welding. In the illustrated embodiment of FIG. 13A, the number of coils, the coil size, and the ring diameter are substantially the same for illustrative purposes only, but can be any shape or size, similar or different, as previously described.

Figure 13B:
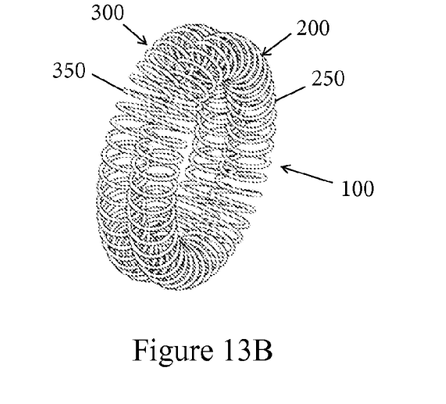

In FIG. 13B, the first canted coil spring 200 and the second canted coil spring 300 are partially nested together. At this partially nested configuration, the spring assembly 100 can be used in a connector application and be housing mounted or piston mounted. The two spring lengths 200, 300 of the spring assembly 100 can be held together in this configuration by joining the springs at one or more contact points. The two nested springs can be held together by friction, by design of the springs, by spot welding, or by mechanical means. The partially nested springs 200, 300 can also held by the housing groove if housing mounted or pin groove if pin mounted. In another example, a third canted coil spring is nested to either the first canted coil spring 200 or the second canted coil spring 300.

Figure 14:
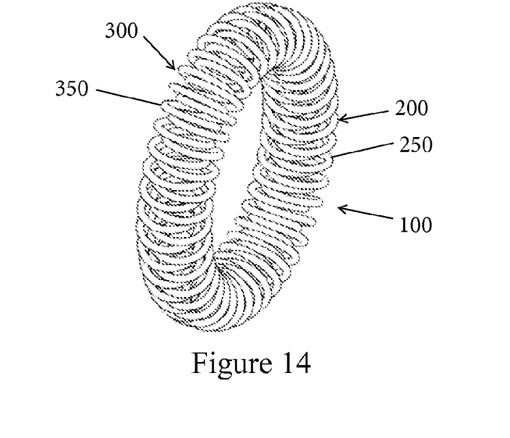
FIG. 14 shows an isometric view of one embodiment of a spring assembly comprising two canted coil springs nested together.

FIG. 14 depicts a spring assembly 100 with two spring lengths that are closely nested to together and share a common or similar coil centerline or shows the spring assembly 100 of FIG. 13b with the first canted coil spring 200 and the second canted coil spring 300 further pushed together to more closely nest together. In another example, a third canted coil spring is closely nested with the first and second canted coil springs 200, 300 so that the three nested canted coil springs share a common or similar coil centerline.

After the spring assembly 100 of FIG. 14 is formed, the spring assembly 100 can be applied in any application that utilizes canting and frictional forces generated when at least one set of canted coils of a canted coil spring length are deflected upon insertion, during removal, and when compressed from a latched coil canting angle to a further canting angle during separation of the pin groove from the housing groove and terminating the common groove.

Figure 15:
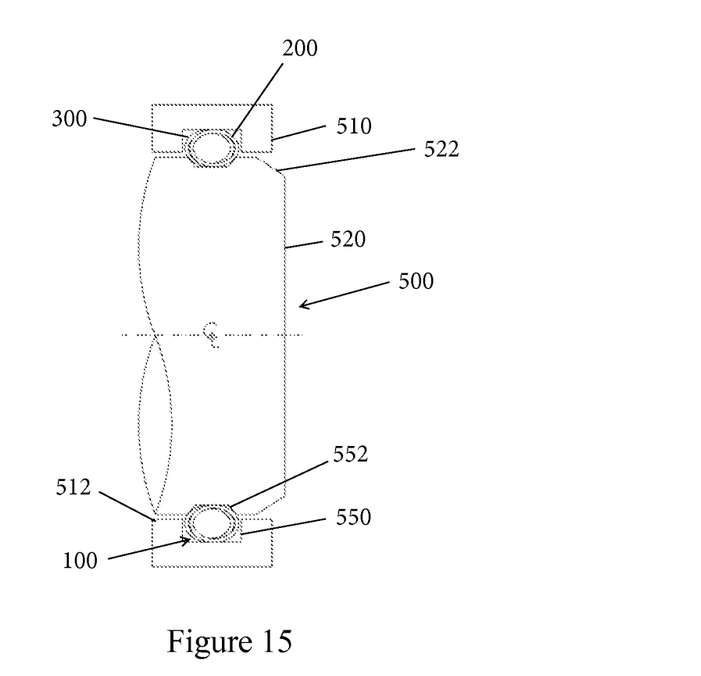
FIG. 15 shows a latching connector assembly including a spring assembly.
Figure 16:
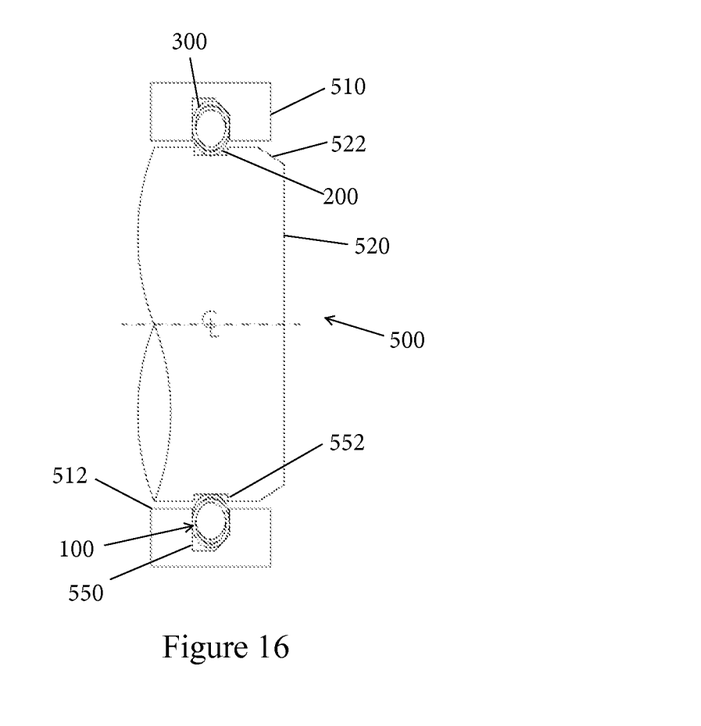
FIG. 16 shows an alternative latching connector assembly comprising a spring assembly.

The spring assembly 100 of the present disclosure can be implemented in connector applications. FIGS. 15 and 16 illustrate embodiments of a connector assembly 500. In the embodiment of FIG. 15, the connector assembly 500 can comprise a housing 510, a shaft 520, such as a pin or a rod, a housing groove 550, a pin groove or shaft groove 552, and a spring assembly 100 received in a common groove defined by the housing groove 550 and the pin groove 552. As shown, the spring assembly 100 is housing mounted prior to insertion of the shaft 520 into the housing 510. Alternatively, the spring assembly can be shaft mounted by placing in the spring assembly 100 onto or into the shaft groove 552 prior to assembling the shaft 520 to the housing 510. The spring assembly 100 is captured by the common groove to latch the shaft 520 to the housing 510. The outer contours of the housing 510 can embody any number of shapes and features and the housing 510 can be part of, such as a component of, another device, such as a fluid connector, a circuit board, etc. The shaft 520 is solid and configured for mechanical connection to the housing with or without electrical carrying capability. When used in a fluid or gas application, the shaft can be hollow and can include other surface features, such as a shoulder for abutting a shoulder on the housing to limit axial play when in the latched position.

In one embodiment, the spring assembly 100 can be used with the connector assembly 500 when disconnection of the shaft 520 from the housing is relatively high compared a spring assembly utilizing only a single spring length or when it is desirous of using two or more spring lengths instead of a single spring length with a relatively stiff or large wire, which can make coiling of the spring more difficult.

In another example, a method is provided in which two canted coil spring rings are nested and housing mounted in the housing groove 550 for receiving the shaft 520 having the shaft groove 552 in a latched configuration. In another example, two canted coil spring rings are nested and shaft mounted in the shaft groove 552 for connection with the housing 510 having the housing groove 550 in a latched configuration. In another embodiment, the spring assembly 100 can be used when engagement between the housing 510 and the shaft 520 requires a permanent or one time connection between the shaft 520 and the housing 510, such as a locking application. The spring assembly 100 can also be used in a latching connector application with preloading. In preloading, the shaft 520 and the housing 510 bias the spring assembly 100 so that the spring assembly exerts an axial force against the shaft groove 552 and the housing groove 510 to eliminate play. The axial force is held by abutting surfaces on the shaft 520 and the housing 510. Separation of the shaft 520 from the housing 510 in the preload application requires further canting the spring assembly 100 from the axial loaded position by the housing groove 550 and pin groove 552 loading against the spring assembly 100.

The shaft 520 can have a tapered insertion end 522 which helps guide the shaft 520 into a bore 512 of the housing 510 as well as initially deflecting the spring assembly 100 as the shaft 520 enters the bore 512. The spring assembly 100 may be formed by nesting two or more spring rings together as described elsewhere herein. The taper angle of the insertion end can vary from between zero degree to 90 degrees from vertical, such as between 10 degrees and 75 degrees from vertical. The shaft groove 552 can include two tapered surfaces with an apex therebetween or with a flat surface located between the two tapered surfaces as shown. In an example, the two tapered surfaces of the pin groove 552 simultaneously contact the spring assembly 100 in the latched position. In a preloaded application, the spring assembly 100 can contact only one of the two tapered surfaces in the latched position. In other examples, the shaft groove 552 comprises two tapered surfaces with an apex therebetween and two sidewalls extending from the two tapered surfaces. The spring assembly 100 can be spaced from the two sidewalls or contact the two sidewalls as well as contact the two tapered surfaces. In another example, the shaft groove 552 is generally round, has two generally parallel sidewalls and a flat bottom wall located therebetween, or has two sidewalls with different sidewall configurations, such as one vertical sidewall and one tapered sidewall. The shaft 520 is disconnectable from the housing 510. Alternatively, the shaft 520 may not have a groove 552 and the application is a holding application. In yet another example, the application is a locking application and the shaft groove 552 is configured so that contact with the spring assembly 100 by the shaft groove 552 is near the major axis of the coils.

The housing 510 can have a tapered receiving end (not shown) to help guide the shaft 520 into the bore 512. The housing groove 550 of the housing 510 can receive the spring assembly 100 in a housing mounted configuration. The housing groove 550 is shown with two generally straight or vertical sidewalls and a bottom wall located therebetween. The housing groove 550 can include two tapered surfaces with an apex therebetween or with a flat surface located between the two tapered surfaces as shown. In an example, the two tapered surfaces of the housing groove 550 simultaneously contact the spring assembly 100 in the latched position. In other examples, the housing groove 550 comprises two tapered surfaces with an apex therebetween and two sidewalls extending from the two tapered surfaces. The spring assembly 100 can be spaced from the two sidewalls or contact the two sidewalls as well as contact the two tapered surfaces. In another example, the housing groove 550 is generally round, has two generally parallel sidewalls and a flat bottom wall located therebetween, or has two sidewalls with different sidewall configurations, such as one vertical sidewall and one tapered sidewall. The shaft 520 is disconnectable from the housing 510. In alternative embodiments, the spring assembly 100 is shaft mounted. Alternatively, the housing 510 may not have a groove 550 and the spring assembly 100 is shaft mounted in a holding application.

The shape of the housing groove 550 and the shaft groove 552 can impact the removal force of the shaft 520 relative to the housing 510. For example, the common groove formed by both the housing groove and the shaft groove can rotate the spring assembly upon latching so that the removal force can be higher or lower due to the rotation. The housing or pin groove can also be sized with added space to enable the spring assembly to garter or expand its outer diameter to reduce insertion forces.

As shown in FIG. 15, the housing groove 550 has sidewalls that are spaced from the spring assembly 100. In other examples, the spring assembly 100 contacts at least one if not both sidewalls of the housing groove 552.

The connector 500 of FIG. 16 is similar to the connector of FIG. 15 with a few exceptions. In the following example, the spring assembly 100 is formed by nesting two axial canted coil spring rings 200, 300 together. The spring assembly 100 of FIG. 16 may embody nested spring types or have more than two nested spring rings. As shown, the spring assembly 100 is housing mounted and the housing groove 550 is sized so that a width measured between the two sidewalls of the groove is smaller than the coil height or minor axis of the spring assembly 100 so as to load or bias the spring assembly prior to and after receiving the pin into the housing. The housing groove 550 is shown with a flat bottom wall and a tapered wall located between two generally vertical sidewalls. In other examples, the housing groove 550 can have a different groove shape, such as having a single flat bottom wall located between two sidewalls or a single tapered wall located between two sidewalls. The pin groove 552 can be generally square or rectangular with a flat bottom wall located between two generally sidewalls. However, the pin groove 552 can have other groove shapes, such as having two tapered surfaces.

Methods of making and of using the canted coil spring assemblies, connector assemblies, and their components described elsewhere herein are understood to be within the scope of the present disclosure.

Although limited embodiments of canted coil spring assemblies, connector assemblies, and their components have been specifically described and illustrated herein, many modifications and variations will be apparent to those skilled in the art. For example, the various canted coil spring assemblies and connector assemblies may incorporate different metal claddings or different platings, may be used in different end applications, etc. For example, the connectors may be used in any number of industries, including in aerospace, automotive, military defense, consumer electronics, oil and gas, etc. Furthermore, it is understood and contemplated that features specifically discussed for a canted coil spring, a helical spring, a ribbon spring, or any other spring, or a connector assembly embodiment may be adopted for inclusion with another canted coil spring, or another connector assembly embodiment provided the functions are compatible. For example, while one connector is described with certain groove geometry and a certain spring ring or spring assembly, different groove geometries and different spring rings with different coil alternating patterns may be used that are described elsewhere herein. Spring assemblies described herein may also be used in seal applications, such as in spring energized lip seals or spring energized face seals. Accordingly, it is to be understood that the canted coil springs, connector assemblies, and their components constructed according to principles of the disclosed devices, systems, and methods may be embodied other than as specifically described herein. Still furthermore, where one feature of an embodiment is shown but not expressly described but the same or similar feature is shown and described in another embodiment, the disclosed part may be understood to describe or teach the same or similar feature in the other disclosed but not expressly described embodiment. The disclosure is therefore understood to teach a person of ordinary skill in the art the disclosed embodiments without having to repeat similar components in all embodiments. The disclosure is also defined in the following claims.

What is claimed is:

1. A spring assembly comprising:
   at least two canted coil springs including a first canted coil spring comprising a plurality of first canted coils, each with different front and back angles, with a first coil centerline so that the first canted coils are deflectable along a direction perpendicular to the first coil centerline and a second canted coil spring comprising a plurality of second canted coils, each with different front and back angles, with a second coil centerline and so that the second canted coils are deflectable along a direction perpendicular to the second coil centerline, the at least two canted coil springs defining a spring ring having a ring centerline,
   wherein at least two sections of first canted coils of the first canted coil spring are each positioned between two adjacent second canted coils of the second canted coil spring, wherein the at least two sections of first canted coils of the first canted coil spring each comprises at least one first canted coil, wherein the first coil centerline of the first canted coil spring is spaced from the second coil centerline of the second canted coil spring, and wherein the first canted coils of the first canted coil spring are located at least partially outside of the second canted coil spring, and the second canted coils of the second canted coil spring are located at least partially outside of the first canted coil spring.

2. The spring assembly according to claim 1, wherein at least half of the first canted coils of the first canted coil spring are each positioned between two adjacent second canted coils of the second canted coil spring.

3. The spring assembly according to claim 2, wherein more than one second canted coil of the second canted coil spring are positioned between two adjacent first canted coils of the first canted coil spring.

4. The spring assembly according to claim 2, wherein each of the second canted coils of the second canted coil spring is positioned between two adjacent first canted coils of the first canted coil spring.

5. The spring assembly according to claim 2, wherein a wire cross section of the first canted coil spring is different than a wire cross section of the second canted coil spring.

6. The spring assembly according to claim 2, wherein a shape of a wire cross section of the first canted coil spring is different than a shape of a wire cross section of the second canted coil spring.

7. The spring assembly according to claim 2, wherein a material of a wire of the first canted coil spring is different than a material of a wire of the second canted coil spring.

8. The spring assembly according to claim 2, wherein a size of the first canted coils of the first canted coil spring is different than a size of the second canted coils of the second canted coil spring.

9. The spring assembly according to claim 8, wherein the size of a single first canted coil and the size of a single second canted coil together define a width of the spring assembly.

10. The spring assembly according to claim 2, wherein a shape of the first canted coils of the first canted coil spring is different than a shape of the second canted coils of the second canted coil spring.

11. The spring assembly according to claim 2, wherein a pitch of the first canted coil spring is different than a pitch of the second canted coil spring.

12. The spring assembly according to claim 2, further comprising a third canted coil spring comprising a plurality of third coils with a third coil centerline, wherein the plurality of third coils of the third canted coil spring are each positioned between two adjacent coils of the second canted coil spring.

13. The spring assembly according to claim 12, wherein the plurality of third coils of the third canted coil spring are not positioned between the first canted coils of the first canted coil spring.

14. The spring assembly according to claim 2, wherein a back or front angle of the first canted coils of the first canted coil spring is different than a back or front angle of the second canted coils of the second canted coil spring.

15. The spring assembly according to claim 2, wherein the first canted coil spring is oriented radially and the second canted coil spring is oriented axially.

16. The spring assembly according to claim 2, wherein a turn angle of the first canted coils of the first canted coil spring is different than a turn angle of the second canted coils of the second canted coil spring.

17. The spring assembly according to claim 2, wherein a total spring force of the spring assembly is at least 1.6 times a spring force provided by either the first canted coil spring or the second canted coil spring.

18. The spring assembly according to claim 2, wherein the first canted coil spring is a spring ring and the second canted coil spring is a spring ring.

19. The spring assembly according to claim 18, wherein at least one of the first canted coil spring and the second canted coil spring has a non-circular shape.

20. The spring assembly according to claim 1, wherein the first canted coil spring is a spring ring with a first ring centerline and the second canted coil spring is a spring ring with a second ring centerline and wherein (i) the first coil centerline of the first canted coil spring and the second coil centerline of the second canted coil spring are located side-by-side relative to the first ring centerline of the first canted coil spring or to the second ring centerline of the second canted coil spring, or (ii) the first coil centerline of the first canted coil spring is located closer to the first ring centerline of the first canted coil spring or to the second ring centerline of the second canted coil spring than the second coil centerline of the second canted coil spring.

21. A connector assembly comprising:
   a housing with a housing groove;
   a shaft with a shaft groove;
   the housing groove and the shaft groove define a common groove; and
   a spring assembly positioned in the common groove to latch or to lock the shaft to the housing, the spring assembly comprising:

at least two canted coil springs including a first canted coil spring comprising a plurality of first canted coils, each with different front and back angles, with a first coil centerline so that the first canted coils are deflectable along a direction perpendicular to the first coil centerline and a second canted coil spring comprising a plurality of second canted coils, each with different front and back angles, with a second coil centerline and so that the second canted coils are deflectable along a direction perpendicular to the second coil centerline, the at least two canted coil springs defining a spring ring having a ring centerline, wherein at least two sections of first canted coils of the first canted coil spring are each positioned between two adjacent second canted coils of the second canted coil spring, wherein the at least two sections of first canted coils of the first canted coil spring each comprises at least one coil, wherein the first canted coil spring and the second canted coil spring are nested together with the first coil centerline of the first canted coil spring positioned adjacent the second coil centerline of the second canted coil spring; and wherein the spring assembly with the nested first and second canted coil springs (i) has an overall coil height that is larger than a coil height of either the first canted coil spring or the second canted coil spring individually, or (ii) an overall coil width that is wider than a coil width of either the first canted coil spring or the second canted coil spring individually.

22. The spring assembly according to claim 1, wherein the first canted coil spring and the second canted coil spring are deflectable along the direction perpendicular to the first coil centerline and the second coil centerline, respectively, independently of the first canted coil spring and the second canted coil spring expanding or compressing about the ring centerline.

\* \* \* \* \*